United States Patent

[11] 3,588,704

[72] Inventor Fred J. Rosenbaum
Clayton, Mo.

[21] Appl. No. 826,869
[22] Filed May 22, 1969
[45] Patented June 28, 1971

[73] Assignee Washington University
St. Louis, Mo.

[54] SWEPT FREQUENCY MICROWAVE GENERATOR
15 Claims, 5 Drawing Figs.

[52] U.S. Cl. .......... 325/105
[51] Int. Cl. .......... H04b 1/04
[50] Field of Search .......... 325/105; 331/107 (G), 107, 116, 115, 90, 91; 333/83

[56] References Cited
UNITED STATES PATENTS 3,379,999 4/1968 Komatsubara .......... 331/107

*Primary Examiner*—Robert L. Griffin
*Assistant Examiner*—Albert J. Mayer
*Attorney*—Jerome A. Gross

ABSTRACT: A compact, lightweight swept frequency microwave oscillator employs an emitting semiconductor device, in a resonant cavity structure formed to polarize emitted waves and to suppress Faraday rotation. Within the cavity structure a ferrite element and a magnetizing coil are used to create flux lines extending longitudinally. Changing the magnetic flux changes the effective inductance and capacitance of the cavity structure, varying the oscillation frequency in a sweep of the X-band.

Inventor
FRED J. ROSENBAUM
By Jerome A. Gross,
Attorney

Inventor
FRED J. ROSENBAUM
By Jerome A. Gross,
Attorney

SWEPT FREQUENCY MICROWAVE GENERATOR

BACKGROUND OF THE INVENTION

This invention relates to microwave sources, and especially to swept frequency sources utilizing energy-emitting semiconductors.

When certain semiconductors are subjected to an electrical bias, they emit coherent energy within the microwave range of frequencies. Semiconductor devices of the types known as transferred electron effect (or "Gunn effect") devices, avalanche diodes, tunnel diodes, have for several years been the subject of experiments in various configurations and circuits. It is known, for example, that their frequency of oscillation may tend to decrease with an increase in bias voltage; however, by changing the bias voltage only a limited frequency sweep may be obtained; also precise voltage control is required, and accompanying undesirable effects may be expected, such as heating of the semiconductor, noise, and power variation.

By placing such an emitting semiconductor in a resonant cavity and changing the physical length of the cavity, there may be some frequency change. Physical mechanisms required for change in physical length do not lend themselves to rapid frequency sweeps. Instead of changing the physical length of the cavity, it has been proposed to vary the permeability of the cavity space by completely filling it with a ferrite and subjecting it to large magnetizing currents, which necessitates heavy, expensive supplementary equipment.

SUMMARY OF THE INVENTION

To vary the oscillation of a semiconductor source over a sweep of frequencies, the present invention relies upon using a fixed resonant cavity structure which converts the emissions of the semiconductor source into a standing electrical wave, polarized by the cavity structure. Its oscillating frequency is varied by creating magnetic flux lines in a phase-shifterlike element, for example, a ferrite element positioned centrally and longitudinally within the resonant cavity structure. The cavity structure utilized is of the type which will suppress Faraday rotation of the polarized wave, for example, a cavity structure of typical rectangular wave guide cross section.

With Faraday rotation suppressed, progressively changing the magnetic flux causes progressive changes in the effective inductance and capacitance of the cavity structure, which interact with the semiconductor source to alter its oscillation frequency. THe inductance-capacitance change is found to progress reliably with changes in magnetic flux; that is, there is a precise correlation between the applied magnetic flux and the microwave frequency generated.

By applying the magnetizing currents according to a desired save form, for example, in a sawtooth wave, the oscillating semiconductor generates a sweep of frequencies broad enough, for example, to cover the X-band. Further, by applying the magnetic flux in a closed toroidal path, the magnetizing current may be discontinued at any chosen flux amplitude; the flux will maintain itself and hence maintain the corresponding inductance-capacitance response of the cavity structure. This in effect latches the semiconductor device to oscillate at a selected frequency.

DESCRIPTION OF THE PREFERRED EMBODIMENT

Figure 1:
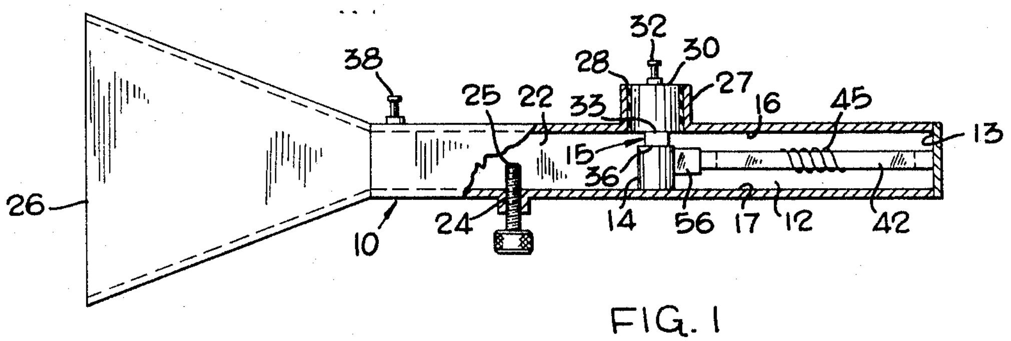
FIG. 1 is a side view, partly broken away, of a swept frequency microwave generator employing toroid coil latching and embodying the present invention, shown without power sources.

Microwave generator apparatus utilizing a preferred embodiment of the present invention is shown in the accompanying drawings. A generator structure, generally designated 10, is made of conductive metal, preferably silver, copper, brass or aluminum, to the rectangular cross section shown in FIG. 3. The structure 10 includes a resonant cavity portion 12 extending lengthwise from a cavity end wall 13 to an internal preferably cylindrical post 14 at the top of which is positioned a semiconductor device generally designated 15 hereinafter referred to. The top wall 16 and bottom wall 17 of the rectangular structure 10 are spaced more closely than its sidewalls 18; this typical waveguide nonsquare cross section is sometimes referred to as "unsymmetrical." Cavity window means, generally designated 20, at which microwave energy escapes from the standing wave within the cavity portion 12, consists of the two openings between the post 14 and the sidewalls 18. As to its width and height, the cavity structure 10 is proportioned as in conventional waveguides of similar rectangular cross section; and with its width and height so established, the length of the cavity portion is substantially half of the guided wave length of microwaves of the frequency to be generated in the absence of magnetizing current.

Forward of the window 20 the rectangular cross section of the structure 10 continues for a length sufficient to serve a waveguide impedance transformer section 22. In the bottom wall 17 of this transformer section 22 is a tapped hole 24 mounting a screwlike metal adjustable impedance matching element 25. The impedance transformer section 22 terminates forwardly in an outward flaring waveguide horn 26.

Spacedly above the post 14, the top wall 16 of the structure 10 has an outstanding cylindrical flange 27 lined by a thin cylindrical insulator 28, in which a metal plug 30 is removably mounted. A first electrical conductor 31, leading to a binding post 32 atop the plug 30, makes a connection through the plug 30 to the upper contact 33 of the emitting semiconductor device 15, mounted to the lower surface of the plug 30 by conventional means not shown. The lower contact 36 of the semiconductor device 15 makes grounding contact against the top of the post 14; a return connector 37 may be provided through a second binding post 38 mounted conveniently on the metal structure 10.

The semiconductor device 15 may be of any type which, when excited by a biasing current, emits coherent energy within the microwave range of frequencies. While avalanche diodes and tunnel diodes may be used, transferred electron effect or "Gunn effect" devices are preferred because of their low bias voltages and low operating temperatures. Crystals of gallium arsenide are known to possess these advantages.

Means must be provided to polarize the coherent energy emitted by the semiconductor device 15, and to suppress Faraday rotation of the polarized wave within the cavity portion 12 attendant to the imposition of a magnetic field. In the embodiments described, the nonrectangular cross section of the cavity structure itself serves both of these purposes.

In waveguides, it has heretofore been known that phase shift may be effected by mounting a ferrite element longitudinally in a rectangular section waveguide and surrounding the waveguide with a coil which will create flux lines longitudinally in the ferrite. Such phase-shifter apparatus is shown in U.S. Pat. No. 3,212,031 to Reggia and Spencer. Where a resonant cavity structure is used instead of a waveguide structure, phase shift is impossible. I have discovered, however, that with such a longitudinally aligned ferrite element, progressively applied magnetic flux, which would cause Faraday rotation if used in a circular waveguide and phase shift in a rectangular waveguide, will tune the oscillating frequency where used with a resonant cavity structure in which neither Faraday rotation nor phase shift is possible. Electromagnetic interaction with the cavity structure changes its inductance and capacitance which are in the effective oscillating circuit with semiconductor device 15.

Figure 2:
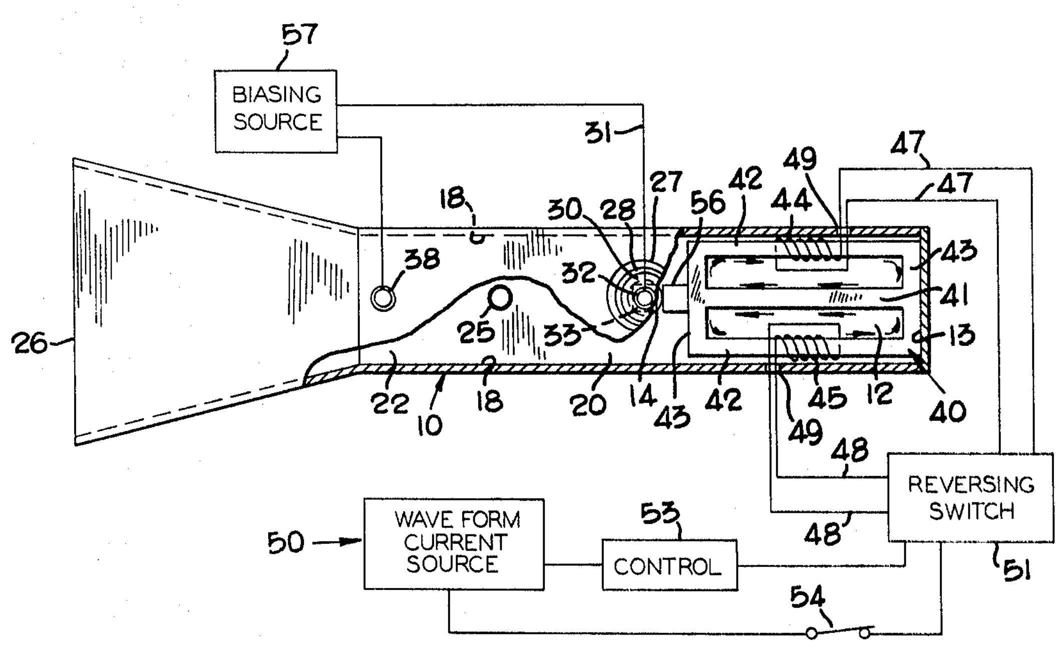
FIG. 2 is a plan view thereof, partly broken away, with power sources shown schematically.
Figure 3:
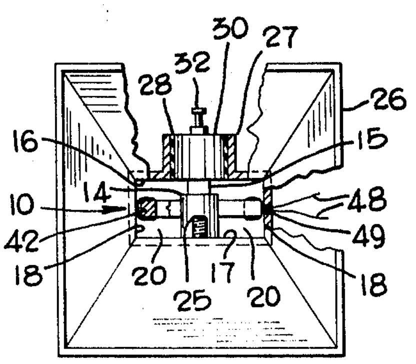
FIG. 3 is a front view thereof, partly broken away.

In the embodiment illustrated in FIGS. 1—3, the magnetic flux is created by a dual toroid coil assembly, shown in the plan view FIG. 2. When its current supply is cut off the continuing toroidal flow of magnetic flux will continue to maintain the same inductance-capacitance characteristics, thereby latching the oscillation frequency.

Mounted in the cavity 12 at approximately its midheight, by conventional support means, now shown (for example, by embedding in plastic material) is a ferrite core element generally designated 40. With its associates coils, to be described, it serves as a dual toroid, having an elongated rodlike central ferrite portion 41, two similar elongated outer ferrite portions 42 extending parallel to the central ferrite portion 41 and to each other, and forward and aft end ferrite portions 43 connecting the elongated portions 41, 42. The portions are continuous in effect, and the element 40 as a whole is best fabricated from sawing from a solid slab of ferrite material.

To provide magnetic flux lines which will extend lengthwise along the central element 41 and longitudinally relative to the cavity structure, and will continue at the same strength when the magnetizing current supply is cut off, two separate magnetizing coils 44, 45, are wound, one about each of the outer ferrite portions 42. As shown in FIG. 2, connectors 47, 48, lead from the respective coils 44, 45 through insulating plugs 49 in the cavity structure 10 and connect in parallel circuit to a waveform current source generally designated 50. For creating a sweep of frequencies, the preferred wave form of current supplied by the source 50 is a sawtooth variation from zero to a predetermined current value. During such variation, the coils 44, 45 are connected in an additive sense, whereby the flows of magnetic flux through the central ferrite element 41 will complement each other as shown in FIG. 2. However, in the connectors 48 is interposed a reversing switch 51, which, on reversal, supplies current to the coils 44, 45 in a bucking sense, wherein the flows of magnetic flux cancel each other. A control generally designated 53, of any conventional type, is so connected to the wave form current source 50 as to cause the reversing switch 51 to operate at the end of each wave, to effect such cancellation.

Current interrupter switch means generally designated 54 is provided to permit discontinuance of the supply of magnetizing current at any selected point along the wave form. To permit interruption of fast frequency sweeps, the interrupter switch 54 may be operated by electronic interconnection to the wave form current source 50.

Forwardly of the dual toroid ferrite element 40 and behind the post 14 is a block 56 of dielectric material, of such size as necessary to function as an impedance matching section.

If, without applying any magnetizing current, a sufficient bias voltage is applied to the semiconductor device 15 by a biasing source 57, it will emit in waves whose frequency is controlled by the resonant cavity portion 12 of the structure 10. Because of the rectangular nonsquare waveguide type structure, the standing electrical wave will be polarized vertically in the cavity portion 12. Microwave energy will then be led out through the cavity window means 20, the impedance transformer section 22 and the waveguide horn 26.

While it is conventional to think of the wave frequency as being determined by the length of the cavity portion 12, it is in fact determined by the effective interrelated inductance-capacitance characteristics of the device, particularly those of the cavity portion 12.

To change the oscillation frequency which is so determined, the wave form current source 50 is actuated to supply current through the closed selector switch 54 to both magnetizing coils 44, 45. This sets up the flow of magnetic flux in the pattern defined by the dual toroid ferrite element 40, with the flux lines in the central ferrite element 41 being additive or complementary, as shown in FIG. 2. The current is supplied from the source 50 in a predetermined wave form, preferably a sawtooth variation from zero to a predetermined current value, so that the magnetic flux increases with the increase in current. At whatever point the current is discontinued, the corresponding magnetic flux will continue to flow around the dual toroid ferrite element 40.

To reduce the magnetic flux to zero, the control 53 actuates the reversing switch 51 when the magnetizing current reaches its maximum value, immediately prior to its reduction to zero. This switch actuation causes the flux from the coil 45 to buck against and cancel that from the coil 44.

For latched operation at any frequency within the range swept, the electronically controlled switch 54 interrupts the waveform current source 50 to discontinue the flow of current at any phase or point along the wave form selected by the operator. The amount of magnetic flux at the point of discontinuance will continue to flow in the dual toroid path, the flux lines being thus maintained at a constant value or intensity. This continues in force those inductance and capacitance characteristics of the cavity structure which correspond to the magnetic flux at point of discontinuance of the magnetizing current. By selective operation of the interrupting switch 54, the oscillation frequency of the semiconductor device 15 may be tuned and latched at any frequency within the range swept.

Figure 4:
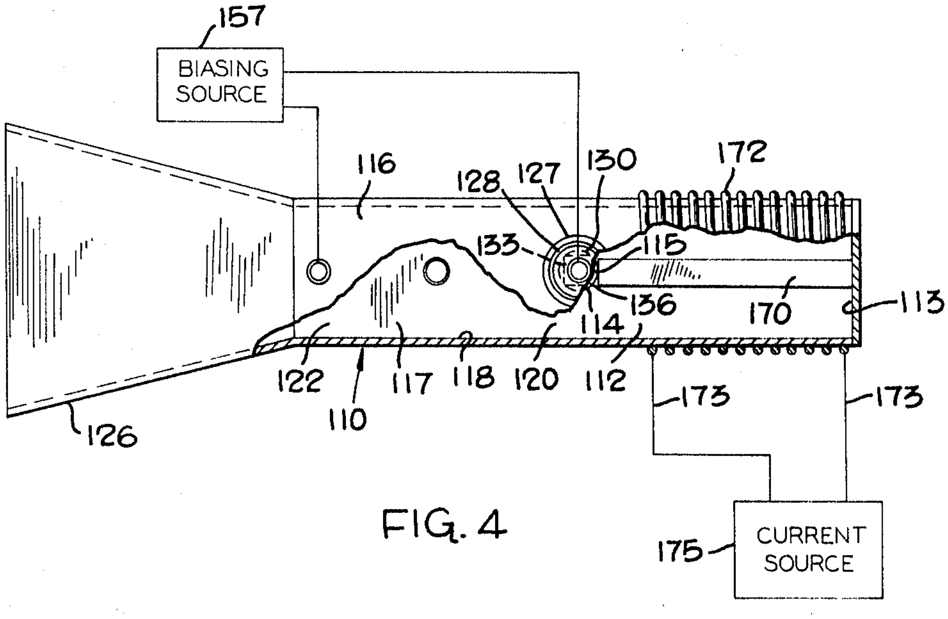
FIG. 4 is a plan view, partly broken away, of an alternate embodiment of invention, without a toroid coil.

The alternate, simpler embodiment of invention, illustrated in FIG. 4, may be used where there is no need for the feature of latched frequency operation. Its cavity structure 110, like the cavity structure 10 of the embodiment heretofore described, is formed to nonsquare rectangular waveguidelike cross section, having a resonant cavity portion 112 with an endwall 113, a top wall 116, bottom wall 117 and sidewalls 118, having also an impedance transformer section 122 which terminates in a waveguide horn 126. Like the earlier embodiment, a cylindrical post 114 extends upwardly from the bottom wall 117, and is flanked by cavity windows 120; the top of the post 114 bears against the lower contact 136 of an emitting semiconductor device 115 mounted to the underside of a metal plug 130 through which current is conducted through its upper contact 133. The plug 130 is removably mounted within a cylindrical insulator 128 in a cylindrical flange 127 which rises upward from the top wall 116. Bias voltage to the semiconductor device 115 is supplied in the same manner as in the prior described embodiment, from a source 157.

A single rodlike ferrite element 170, generally similar to the central ferrite portion 41 of the preceding embodiment, is centrally end wall in the cavity portion 112 to extend substantially from the post portion 114 to the end wall 113. Around the outside of the cavity portion 112, that is, over its top wall 116, bottom wall 117 and sidewalls 118, is wound a magnetizing coil 172, to which magnetizing current is supplied through leads 173 from a variable current source generally designated 175. If the apparatus is to be used as a swept frequency microwave generator, the current source may be such as will generate current in a desired wave form, for example, a sawtooth wave form; for other uses the current source 175 may be of the type which may be set at a constant value, or varied manually or by other means, for example, by electronic controls.

In the absence of magnetizing current, the apparatus will establish an initial oscillating frequency for the semiconductor device 115. When the variable current source 175 is actuated to supply current to the magnetizing coil 172, electromagnetic interaction which attends the suppression of Faraday rotation will alter the effective inductance-capacitance of the resonant cavity structure 112, thus tuning the oscillation frequency of the semiconductor device 115. As long as the current source 175 supplies current at a constant value, the oscillating frequency will remain constant. By setting the variable current source 175 to furnish current in a sawtooth wave, frequencies will be generated in periodic sweeps.

Figure 5:
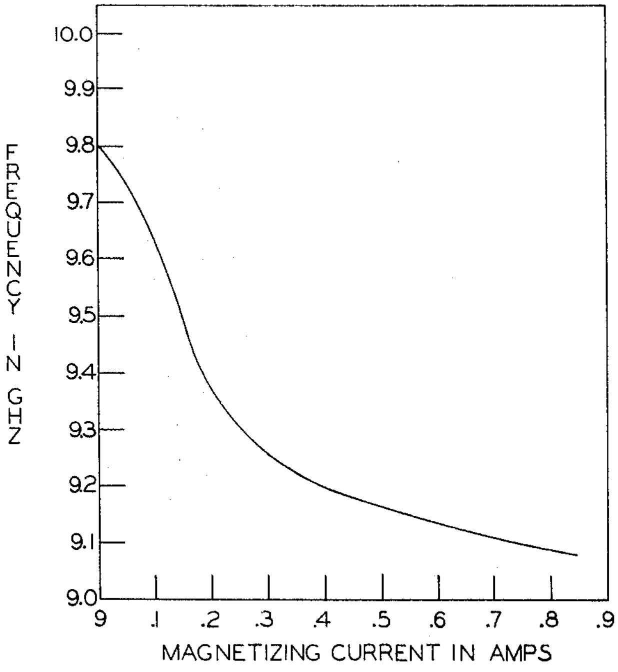
FIG. 5 is a graph showing how magnetizing current will tune the oscillation frequency of the microwave generator.

I have established experimentally, using a structure similar to the structure 110, with a *GaAs* semiconductor device biased at a voltage of 9 volts and a current flow of 470 milliamperes, that a frequency sweep of 640 MHz, from 9.74 to 9.10 GHz, may be effected by applying a small magnetizing current, ranging from zero to approximately 0.85 amperes. As shown in FIG. 5, the frequency will vary inversely with the magnetizing current, in a curve which is almost linear over the initial, greater part of the frequency sweep. This tuning of oscillation frequency by magnetizing current is reliable; hence the present invention is suitable for both commercial and scientific applications.

It is believed that the unique results achieved by the present invention may be explained as follows:

If the resonant cavity structure were cylindrical, the application of magnetic flux in the manner here shown would cause Faraday rotation of a polarized standing wave, rather than substantial frequency change. The nonsquare waveguide-type cross section of the cavity here utilized is unsymmetrical, thereby limiting rotation of a polarized wave. Although actual rotation does not occur, even a small magnetic flux will cause significant amounts of energy to exist in the structure in a perturbed cross-polarized mode. Additional portions of the structure 12 are thus contributing to its inductance and capacitance. Such new inductance-capacitance characteristics are progressively tunable. Small increments of magnetizing current reliably increase this perturbed cross-polarized mode, progressively changing the inductance and capacitance to tune the oscillation frequency.

The simplicity and light weight of the elements illustrated and of the required supplementary electrical sources open for the present invention a wide range of uses, for each of which suitable alterations of the described embodiment will be apparent to those skilled in the art.

In the claims, by the term "ferritelike" is meant those materials with ferri-magnetic properties and low electrical conductivity. By "resonant cavity structure" is meant any microwave structure which will transform microwave energy into a resonant standing wave. By "magnetically variable phase shifter means" is meant any magnetically variable means which in a waveguide would cause phase shift.

I claim:

1. A microwave generator, comprising:
- a semiconductor of a type which, when subject to a current bias, oscillates to emit coherent energy within the microwave range of frequencies;
- means to connect the semiconductor to an electrical bias sufficient to cause such emission of energy;
- a resonant cavity structure formed of an electrically conductive metal;
- means to mount said semiconductor relative to the cavity structure so that its emissions will cause resonance therein;
- the cavity structure having means to polarize such coherent energy and means to suppress Faraday rotation attendant to the imposition of a magnetic field;
- the cavity structure further having means to lead out such energy in microwaves;
- a ferritelike element;
- magnetizing coil means to create magnetic flux lines extending lengthwise along the ferrite element and longitudinally relative to the cavity structure; and
- means to supply current to said magnetizing coil means, whereby, by reason of such suppression of Faraday rotation, electromagnetic interaction between the ferrite element and the microwave fields in the cavity structure will fix its effective inductance-capacitance characteristics, and the resulting oscillating frequency of the semiconductor will be altered and controlled by said inductance-capacitance characteristics.

2. A microwave generator as defined in claim 1, wherein the means to lead out such energy includes a waveguide impedance transformer section and a waveguide horn.

3. A microwave generator as defined in claim 1, wherein the means to lead out such energy includes a waveguide impedance transformer section and adjustable impedance matching means therein.

4. A microwave generator as defined in claim 1, wherein the resonant cavity structure is of nonsquare rectangular cross section, whereby the shape of the structure serves as the means to polarize such coherent energy and to suppress Faraday rotation.

5. A microwave generator as defined in claim 4, wherein:
- the cavity structure includes an end wall;
- the means to mount the semiconductor includes a postlike portion of the cavity structure extending therein from one of the longer walls of said cross section at a point midway between the shorter walls of said cross section and at a distance from the end wall substantially one-half the length of a standing wave to be generated in the cavity structure; and
- said postlike portion being smaller in cross section than the cavity structure, whereby to leave cavity window means thereadjacent, and wherein the means to lead out such energy includes said cavity window means.

6. A microwave generator as defined in claim 5, wherein:
- the cavity structure opposite the postlike portion includes an external flange;
- the means to mount the semiconductor further includes:
- a hollow cylindrical insulator within said flange; and
- a removable metal plug within said insulator and mounting the semiconductor abutting and in electrical-conducting contact between the plug and the postlike portion.

7. A microwave generator as defined in claim 1, together with means to alter the semiconductor current bias in timed pulses, whereby to provide signals interrupting the frequency so generated.

8. A swept frequency microwave generator, comprising the microwave generator defined in claim 1, wherein the means to supply current to the magnetizing coil means comprises means to supply such current in a predetermined wave form, whereby to effect continuous changes of the effective inductance-capacitance characteristics of the cavity and thereby of its oscillation frequency.

9. A swept frequency microwave generator as defined in claim 8, wherein the wave form of current supplied to the magnetizing coil is a saw tooth variation from zero to a predetermined current value.

10. A latched frequency microwave generator, comprising:
- a microwave generator as defined in claim 1, wherein:
- the ferrite element and magnetizing coil means are of the type as together provide toroid coil means to maintain such magnetic flux lines; and
- the means to supply the magnetizing current includes means to cut off its supply, whereby on cutting off the current supply, the said magnetic flux lines will continue at a constant value, thereby maintaining constant the effective inductance and capacitance characteristics of the cavity structure and the oscillation frequency corresponding thereto, together with means operable to cancel the continuing magnetic flux.

11. A microwave generator adapted to oscillate over a sweep of frequencies and to be latched at any chosen frequency therein, comprising:
- the latched frequency microwave generator defined in claim 10, wherein:
- the means to supply current to the magnetizing coil means comprises means to supply such current in a predetermined wave form, and the means to cut off the current supply includes interrupter switch means to cut off such current supply at a selected point along said waveform, whereby cutting off the magnetizing current supply will maintain a chosen oscillation frequency until the means to cancel the magnetic flux is operated.

12. A latched frequency microwave generator, comprising:
- A microwave generator as defined in claim 1, wherein:
- the ferrite element includes:
- one elongated central ferrite portion;
- two elongated outer ferrite portions, extending parallel to each other and longitudinally relative to the cavity structure, and end portions connecting said elongated portions, and wherein the magnetizing coil means includes:
- separate coil means, adjacent to each of the outer ferrite portions, to create magnetic flux lines extending lengthwise relative thereto, whereby, on once supplying magnetizing current to said separate coil means to create flux lines directed in the same sense, magnetic flux will flow continuously through the central ferrite portions without further magnetizing current, in the manner of a dual toroid coil, thereby maintaining a constant oscillation frequency, and thereafter on supplying current to said separate coil means to create flux lines directed in opposite senses, flow of magnetic flux through the central ferrite portions will be cancelled.

13. A microwave generator adapted to oscillate over a sweep of frequencies and to be latched at any chosen frequency therein, comprising:

the latched frequency microwave generator defined in claim 12, wherein:

the means to supply current to the magnetizing coil means includes means to supply such current to both said separate coil means in a predetermined wave form;

whereby to effect continuous changes of the inductance-capacitance characteristics of the cavity and thereby of its oscillation frequency, together with:

means to discontinue such supply of magnetizing current at a selected point along the wave form; whereby on such discontinuance, magnetic flux will flow continuously, and thereby maintain a constant oscillation frequency corresponding to the selected point along the wave form; and means to supply magnetizing current to one of said separate coil means in such sense as to cancel the flow of magnetic flux, and thereafter to recommence supplying said magnetizing current to both said coil means in said predetermined wave form.

14. A microwave generator, comprising:

a semiconductor of a type which, when subject to a current bias, oscillates to emit coherent energy within the microwave range of frequencies;

means to connect the semiconductor to an electrical bias sufficient to cause such emission of energy;

microwave structure means to transform such coherent energy into a resonant standing wave; and having means to polarize such coherent energy and means to suppress Faraday rotation, in combination with magnetically variable phase shifter means; and whereby on magnetically varying same, the existence of resonance prevents phase shift and results in frequency shift.

15. A latched frequency microwave generator comprising;

the microwave generator defined in claim 14, wherein the magnetically variable phase shifter means includes toroidal coil means to maintain the phase shifter means at a constant magnetic flux; and whereby on discontinuance of magnetizing current, the oscillation frequency at discontinuance will be maintained by the continued flow of magnetic flux in said toroidal coil means.